(12) United States Patent
Berger et al.

(10) Patent No.: US 9,227,673 B2
(45) Date of Patent: Jan. 5, 2016

(54) VEHICLE PILLAR

(71) Applicant: GM GLOBAL TECHNOLOGY OPERATIONS LLC, Detroit, MI (US)

(72) Inventors: Elisabeth J. Berger, Farmington Hills, MI (US); Peter H. Foss, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/095,116

(22) Filed: Dec. 3, 2013

(65) Prior Publication Data

US 2015/0151796 A1  Jun. 4, 2015

(51) Int. Cl.
| | |
|---|---|
| *B62D 29/04* | (2006.01) |
| *B29C 70/68* | (2006.01) |
| *B62D 25/04* | (2006.01) |
| *B62D 29/00* | (2006.01) |
| *B29C 70/86* | (2006.01) |
| *B29C 70/08* | (2006.01) |
| *B29K 105/14* | (2006.01) |
| *B29L 31/30* | (2006.01) |

(52) U.S. Cl.
CPC ............ *B62D 29/043* (2013.01); *B29C 70/081* (2013.01); *B29C 70/68* (2013.01); *B29C 70/682* (2013.01); *B29C 70/86* (2013.01); *B62D 25/04* (2013.01); *B62D 29/001* (2013.01); *B29K 2105/14* (2013.01); *B29K 2995/0026* (2013.01); *B29L 2031/3041* (2013.01)

(58) Field of Classification Search
CPC .... B62D 29/043; B62D 25/04; B62D 29/001; B29C 70/68; B29C 70/682; B29C 70/86; B29C 70/081; B29K 2105/14; B29K 2995/0026; B29L 2031/3041
USPC ..................................................... 296/193.06
See application file for complete search history.

(56) References Cited

U.S. PATENT DOCUMENTS

| | | |
|---|---|---|
| 4,988,142 A | 1/1991 | Chandler et al. |
| 5,039,566 A | 8/1991 | Skubic et al. |
| 5,941,596 A | 8/1999 | See |
| 6,669,275 B2 | 12/2003 | Frasher et al. |
| 8,323,436 B2 | 12/2012 | Sennett et al. |
| 2011/0248525 A1* | 10/2011 | Lundstroem .................. 296/191 |

\* cited by examiner

*Primary Examiner* — Glenn Dayoan
*Assistant Examiner* — Melissa A Black
(74) *Attorney, Agent, or Firm* — Dierker & Associates, P.C.

(57) ABSTRACT

A pillar for a vehicle includes a translucent polymer composite having chopped reinforcing fibers incorporated therein. The pillar also includes a truss embedded in the translucent polymer composite and disposed substantially along a length of the pillar. The truss and the translucent polymer composite share a loading condition applied to the pillar. The pillar is to be disposed between a lower body portion of the vehicle and a roof of the vehicle to support the roof.

23 Claims, 3 Drawing Sheets

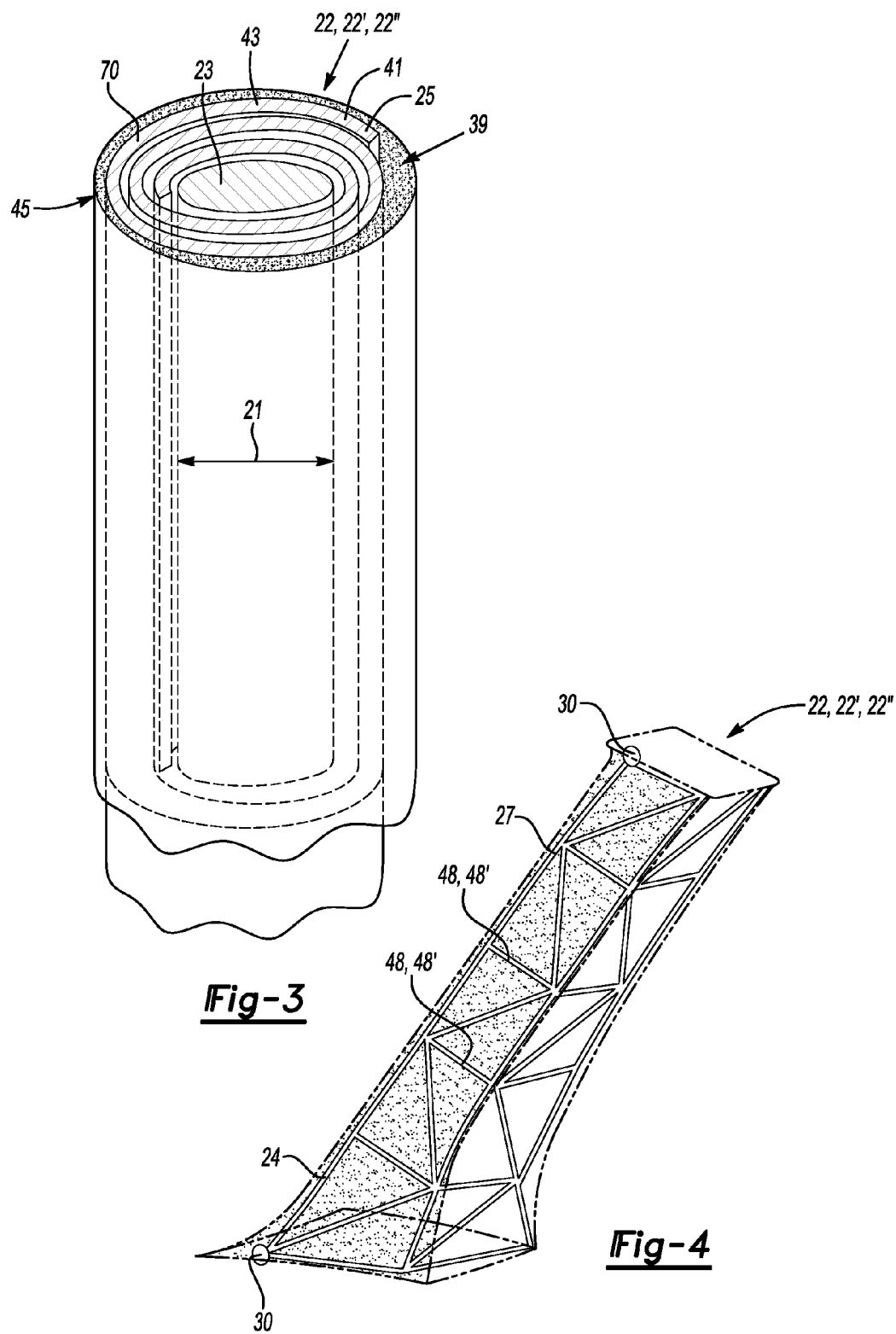

VEHICLE PILLAR

TECHNICAL FIELD

The present disclosure relates generally to a pillar for a vehicle.

BACKGROUND

Pillars are used in vehicles to provide support between a lower body portion and a roof portion of the vehicle. A quantity of pillars may depend on the shape, size, and body style of the vehicle (e.g., coupe, sedan, wagon, etc.). A sedan is a vehicle with a body that has 3 compartments, (engine, passenger, cargo), two rows of seats, and 3 pillars on each side of the vehicle. Pillars may be given alphabetical letter designations in order from the front to the rear of the vehicle while viewing the vehicle in profile. Typically, a pillar at the front of the passenger compartment is designated an "A-pillar". A pillar between the doors of a sedan would be a "B-pillar", and the pillar in the back of the passenger compartment would be a "C-pillar." Pillars are implied where there is a break between doors or glass, even if there is no vertical support at the break. As such, in some vehicle body styles, a pillar may be skipped. For example, some coupes may not have a B-pillar, but the rearmost pillar is designated the "C-pillar". In some vehicles with 3 or more doors on a side, the additional pillars between the doors would be designated "B1", "B2", etc. In some vehicles, a pillar may define an edge of a field of view outside of the vehicle from a vantage point in the passenger compartment.

SUMMARY

A pillar for a vehicle includes a translucent polymer composite having chopped reinforcing fibers incorporated therein. The pillar also includes a truss embedded in the translucent polymer composite and disposed substantially along a length of the pillar. The truss and the translucent polymer composite share a loading condition applied to the pillar. The pillar is to be disposed between a lower body portion of the vehicle and a roof of the vehicle to support the roof.

A method for making a pillar is also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a semi-schematic perspective view of an example of a pillar having fabric reinforced outer layers according to the present disclosure;

FIG. 4 is a semi-schematic cross-sectional view of an example of a pillar having connectors according to the present disclosure;

DETAILED DESCRIPTION

Examples of the present disclosure provide a pillar that may enlarge a field of view from a vantage point inside a passenger compartment of a vehicle. Pillars according to the present disclosure may allow visual perception of an object outside the field of view defined by an edge of a vehicle window opening adjacent to the pillar. As used herein, visual perception means at least visual presence detection of the object by an observer inside the vehicle. This visual perception may enhance the observer's situational awareness during operation of a vehicle. Examples of the present disclosure may allow such visual perception by having optical transmissibility.

Optical transmissibility as used herein may include the property of transparency or translucency. As used herein, transparency is a physical property of a material that allows light to pass through the material without being scattered or reflected. Optically transparent materials (e.g., plate glass and clean water), allow much of the light that impinges on them to be transmitted without being reflected.

Translucency is a physical property of a material that allows light to pass through the material with some scattering at material interfaces where there is a change in the index of refraction. Further, photons may be scattered internally in the material. The property of translucency includes transparency. A translucent material allows the transport of light; a transparent material not only allows the transport of light but also the clear formation of an image.

The opposite of "translucent" is "opaque." Opaque materials do not allow the transmission of light. It is to be understood that materials may be translucent to some wavelengths and opaque to other wavelengths. As such, materials may allow only certain colors of light to pass through even though a source of the light may be a broad band including many wavelengths.

Figure 1:
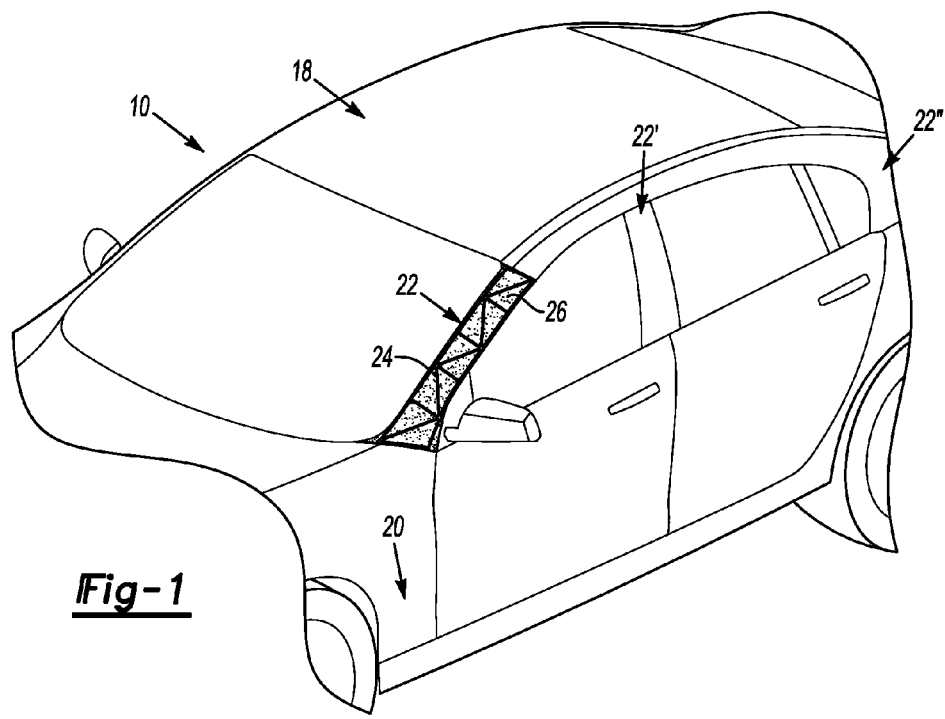
FIG. 1 is a semi-schematic perspective view of an example of a portion of a vehicle including an A-pillar according to the present disclosure.

FIG. 1 semi-schematically depicts an example of a vehicle 10 having an "A"-pillar 22, a "B"-pillar 22', and a "C"-pillar 22". The pillars 22, 22', 22" support a roof 18 on a lower body portion 20 of the vehicle 10. The "A"-pillar 22 in FIG. 1 is depicted having a translucent polymer composite 26 with a truss structure 24 embedded in the translucent polymer composite 26 according to the present disclosure.

It is to be understood that examples of the pillar 22, 22', 22" disclosed herein have optical transmissibility and provide structural support between the roof 18 and the lower body portion 20. Although an A-pillar 22 may be used in examples described herein, it is to be understood that pillars 22, 22', 22" according to the present disclosure may be any pillar in a vehicle. For example, a pillar 22, 22', 22" may be an A-pillar 22, a B-pillar 22', or a C-pillar 22". Additionally, the pillar may be a D-pillar, B1-pillar, B2-pillar, (not shown) or any other pillar between the roof 18 and the lower body portion 20. In other examples, pillars according to the present disclosure may be used in any vehicle, including land, air and sea vehicles. Examples of pillars according to the present disclosure may be in static structures including, for example, observation towers.

The translucent polymer composite 26 included in the pillar 22, 22', 22" of the present disclosure may have chopped reinforcing fibers 28 incorporated therein. The chopped reinforcing fibers 28 may be made from any suitable material, in any shape, size, and configuration. Although the word "chopped" is included to describe the chopped reinforcing fibers 28, "chopped" is not intended to imply any particular method of creating fibers of a particular length. The word "chopped" is used herein to distinguish the length of the fibers from long fibers. For example, the chopped reinforcing fibers 28 may originate as long glass fibers, that are chopped or broken into sections. The sections may range in length for example from about 2 mm (millimeters) to about 25 mm. The chopped reinforcing fibers 28 may have, for example, circular or rectangular cross-sections. Although fibers may also be included as part of the truss 24 to reinforce the pillar 22, 22', 22", as used herein, the chopped reinforcing fibers 28 of the translucent polymer composite 26 are distinct from, and in addition to, the truss 24.

In examples of the present disclosure, the resin may be a thermoset resin, for example, epoxy, polyester, or vinyl ester. In other examples, the resin may be thermoplastic resin, for example, polypropylene, polyamide, polymethylmethacrylate, polycarbonate, or combinations thereof. In some examples, the translucent polymer composite 26 may be untinted. In other examples, the translucent polymer composite 26 may be tinted by, for example, mixing pigment or dye with the resin. In an example, the translucent polymer composite 26 may have a color to match, complement or coordinate with a color theme of the vehicle 10. For example, a translucent color of the pillar 22, 22', 22" may coordinate with a body paint color in an aesthetically pleasing way. One example of an aesthetically pleasing color combination is a match between the hue of the pillar 22, 22', 22" and the hue of the body paint.

In examples of the present disclosure, the chopped reinforcing fibers 28 may have an index of refraction similar to the resin (when the resin is cured). Without being held bound to any theory, it is believed that when the chopped reinforcing fibers 28 and the resin have similar indices of refraction, optical transmissibility of the pillar 22, 22', 22" is enhanced. A sizing or coating may be applied to the chopped reinforcing fibers 28 to minimize the effect of a difference in the indices of refraction of the chopped reinforcing fibers 28 and the resin. Examples of the present disclosure may include a relatively small amount of chopped reinforcement fibers 28 that do not have an index of refraction similar to the resin. The relatively small amount of such fibers would be an amount of fibers that reduces translucence of the pillar by less than about 10 percent. In examples having chopped reinforcement fibers 28 that do not have a refractive index matched to the resin, or have significant color, the chopped reinforcement fibers 28 may be used as a visual design element. For instance, a swirl pattern could be introduced with a relatively small amount of carbon fibers. Other colored fibers may be included as chopped reinforcement fibers 28, such as aramid (either the natural gold/yellow color or dyed colors such as blue, red, or orange). Color may also be imparted to the chopped reinforcement fibers 28 by a sizing or coating which is not soluble in the resin. As used herein, a visual design element is a spatial difference in translucence presenting an observable visual communication.

Examples of the pillar 22, 22', 22" may include such a spatial difference in translucence presenting an observable visual communication. For example, areas of the pillar 22, 22', 22" may be more opaque than other areas of the pillar 22, 22', 22" that are more translucent. In another example, the spatial difference may be a spatial color difference. The spatial difference may present a visual image that communicates to an observer. For example, the spatial difference may present text to an observer, thereby communicating written words. In another example, the spatial difference may present a symbol, logo, or other image. In yet another example, the spatial difference may present a pattern (e.g., swirls, lines, etc.) that does not communicate a message, however the spatial difference may have some artistic appeal to some observers.

Figure 2:
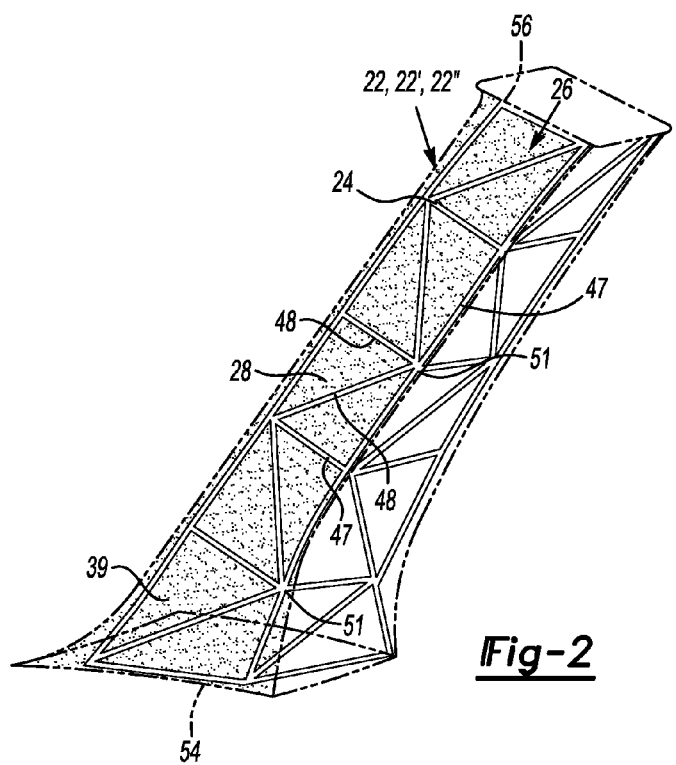
FIG. 2 is a semi-schematic cross-sectional view of an example of a pillar according to the present disclosure.

FIG. 2 semi-schematically depicts a pillar 22, 22', 22" including an embedded truss 24. A cross-section is taken through the pillar 22, 22', 22" from top to bottom in the orientation shown in FIG. 2. The cross-section view depicted in FIG. 2 exposes a portion of the truss 24 shown schematically in FIG. 2. Examples of the truss 24 are not necessarily shaped like the schematic truss 24 depicted in FIG. 2. In the example depicted in FIG. 2, truss members form triangular cells in three dimensional space. The truss 24 is constructed to be disposed substantially along a length of the pillar 22, 22', 22". As used herein, a length of the pillar 22, 22', 22" means a linear dimension in a direction between a lower end 54 of the pillar 22, 22', 22" to be attached to the lower body portion 20 (see FIG. 1) and an upper end 56 to be attached to the roof 18. The pillar 22, 22', 22" may include a translucent polymer composite 26 applied around the truss 24 to form the pillar 22, 22', 22". The translucent polymer composite 26 may have chopped reinforcing fibers 28 incorporated therein. The truss 24 and the translucent polymer composite 26 share a loading condition applied to the pillar 22.

As used herein, a loading condition means a state of application of force, torque, or combinations thereof that induces mechanical stress on a body. The induced mechanical stress may include tensile stress, compression stress, shear stress and combinations thereof. For example, the weight of the roof 18 may produce compression stress on the pillar 22, 22', 22". Examples of the present disclosure share the load of the weight of the roof 18 between the truss 24 and the translucent polymer composite 26. Sharing the loading condition may include support of the truss 24 so that the truss 24 is able to withstand substantially higher loads when combined with the translucent polymer composite 26 compared to the loads that the truss 24 could withstand without the translucent polymer composite 26. As used herein, to withstand a load means elastic and plastic deformation are within predetermined acceptable limits. For example, a truss 24 that may buckle under a certain load may be prevented from buckling under the same load by a translucent polymer composite 26 applied to a pillar 22, 22', 22" according to the present disclosure. In turn, the addition of the truss 24 to the translucent polymer composite 26 increases the load condition which the translucent polymer composite 26 can withstand without fracturing or exceeding predetermined limits for elastic or plastic deformation.

For example, the truss 24 may include rods 47 of predominately unidirectional fibers embedded in resin. These rods 47 may be joined at nodes 51, thereby forming patterns of triangles, with the triangle sides in the direction of the loads. The truss elements 48 may be disposed at an outer surface of the pillar 22, 22', 22", or may be located anywhere in the pillar 22, 22', 22". The truss 24 may be made from various materials and formed in various shapes. For example, the truss 24 may be a metal structure. Examples of the truss 24 may be formed from metal by, for example, die casting, sand casting, squeeze casting, etc. A metal truss may also be formed by joining rods 47. Yet other examples of the truss 24 may include carbon fiber, a para-aramid synthetic fiber (e.g., Kevlar® fiber (yellow or dyed) from DuPont), or a glass fiber. In some examples, forming the truss elements 48 may include filament winding. Examples of the truss 24 may be formed from fibers (e.g. glass or carbon) embedded in resin. In some examples, a fiber/resin composite truss 24 may be formed including thermoplastic polymers by, for example, compression molding, or injection-compression molding. In still other examples, the fiber/resin composite truss 24 may include a thermoset polymer. Examples of the fiber/resin truss 24 may be formed from thermoset polymers by, for example, compression molding, injection-compression molding, resin transfer molding, structural reaction injection molding, bonding, pultrusion, and vacuum bagging, etc.

In an example of the present disclosure, the truss 24 may be a transparent or translucent composite material formed separately from the translucent polymer composite 26. In the example in which the truss 24 is transparent or translucent composite, the type of fiber and type of resin that are formed into the truss 24 are not necessarily the same as the type of fiber and type of resin that are included in the translucent polymer composite 26.

Examples of the truss 24 may be formed of a plurality of truss elements 48. As used herein, truss element 48 includes e.g. a post, column, beam, or arch etc. that may be assembled with other truss elements 48 to form a truss. The truss elements 48 may have different colors. The truss 24 may be pre-assembled. Pre-assembled as used herein means the plurality of elements 48 of truss 24 may be assembled prior to integration with the translucent polymer composite 26. For example, a truss 24 may include rod 47 elements or tube elements that may be joined together. Truss elements 48 may be attached to other truss elements 48 by methods that may include welding, bonding, mechanical fastening, etc. Mechanical fasteners may be shaped to form a logo or convey a message as well as perform as mechanical fasteners. In other examples, such message-conveying shapes may be added to the composite without serving as mechanical fasteners. It is to be understood that the attachment method may vary by the material of the truss elements 48 used to form the truss 24. Additionally, the orientation of the individual truss elements 48 may be selected to support predetermined loads. For example, the truss elements 48 may vary in angular position relative to the pillar 22, 22', 22" throughout the length of the pillar 22, 22', 22".

In an example, the truss 24 is not pre-assembled. Elements of the truss 24 may be arranged in a mold cavity. Thereafter, the translucent polymer composite 26 may be introduced (e.g. by injection) into the mold cavity to fix the truss elements in respective, relative positions to form the truss 24.

The truss 24 may be embedded in the translucent polymer composite 26 in a variety of ways to form the pillar 22, 22', 22" of the present disclosure. For examples including thermoset translucent polymer resins, the pillar 22, 22', 22" may be formed with the truss 24 by compression molding, resin transfer molding, structural reaction injection molding, vacuum bagging, and/or autoclaving. For examples including thermoplastic polymer resins, the pillar 22, 22', 22" may be formed with the truss 24 by injection molding, compression molding, injection-compression molding, vacuum bagging, and/or autoclaving.

A method of applying the translucent polymer composite 26 around the truss 24 may include the steps of inserting the truss 24 in a mold cavity; introducing the translucent polymer composite 26 into the mold cavity to surround the truss 24; at least partially curing the translucent polymer composite 26; and removing the pillar from the mold. In an example, the chopped reinforcing fibers 28 may be sprinkled or mixed into a bath (not shown) of resin 39 to make the translucent polymer composite 26. The translucent polymer composite 26 may be introduced into the mold by pouring into the mold cavity after the truss 24 has been inserted into the mold cavity.

FIG. 3 is a semi-schematic perspective view of an example of a pillar 22, 22', 22" having fabric 41 reinforced outer layers 25 according to the present disclosure. The translucent polymer composite 26 may include one or more fabric 41 layers 70 to form an outer shell. In some examples of the present disclosure, the fabric 41 in the fabric layers 70 may be pre-saturated with uncured polymeric resin. Such pre-saturated fabric may also be known as prepreg. The fabric reinforcement sheet may include woven or nonwoven fibers. The fibers may be glass fibers, synthetic polymer fibers (e.g. Nylon or Kevlar), basalt fibers, carbon fibers, or plant fibers, for example bamboo, or flax fibers. In examples, the fibers may be transparent, opaque, or combinations thereof. It is to be understood that fabrics 41 made from glass, Nylon, and other fibers that tend to be more transparent when embedded in the resin 39 may be included in examples of the present disclosure where the truss 24 is relatively transparent. Some translucency may be achieved with a translucent polymer composite 26 having opaque fibers spaced in the resin to allow light to pass through the translucent polymer composite 26. In some examples where the fabric reinforcement sheet does not contribute as much to the overall strength of the truss 24, opaque fibers may be spaced with a solidity factor of about 5% and still allow substantial transparency of the truss 24, and the pillar 22, 22', 22". It is to be understood that the light path through the translucent polymer composite 26 may be directly through the translucent polymer composite 26, or it may include a plurality of reflections and refractions.

In the example depicted in FIG. 3, the fabric 41 is rolled around a removable mandrel 23 where together the fabric 41 reinforced outer layers 25 and polymer resin 39 form an outer frame 45 of the pillar 22, 22', 22". Some examples of the present disclosure, the chopped reinforcement fibers 28 may or may not be included in the resin 39. In the example depicted in FIG. 3, several layers of fiber glass cloth 43 are rolled around the mandrel 23. FIG. 3 is semi-schematic; sizes and spacing shown are not necessarily representative of sizes and spacing disclosed herein. In some examples, the width 21 of the mandrel 23 may range from about 100 mm to about 200 mm. In examples of the present disclosure, the mandrel 23 may have any cross-sectional shape. The mandrel 23 may be removable, or the mandrel 23 may be left in place to form part of the structure of the pillar 22, 22', 22" if the mandrel 23 is hollow. A removable mandrel 23 may be inflatable by a fluid for operation as the mandrel 23, and deflatable to remove the mandrel 23 from the pillar 22, 22', 22". Shape memory materials may be used for the mandrel 23 to enhance removability. The reinforcement fabric 41 may be infused with resin 39 as prepreg, or by, for example, resin transfer molding, or structural reaction injection molding. In some examples, after the resin 39 is infused, the outer frame 45 may be molded to a finished shape by, for example, compression molding, vacuum bagging, or autoclave molding. The truss 24 (see FIG. 4) may be inserted into this outer frame 45 to share the load of the weight applied to the pillar 22, 22', 22".

In examples having a pillar 22, 22', 22" with a hollow center, certain components, (e.g. wiring, air bags, etc.) may be made visible through the transparent/translucent portions of the pillar 22, 22', 22". The volume occupied by the wiring, etc., may be minimized.

FIG. 4 schematically depicts electrical or optical connectors 30 at each end of the truss 24. Elements 48 of the truss 24 may be electrical conductors or optical waveguides to transfer power or data. For example, a metal truss element 48' may be used as an electrical conductor. Glass fibers in a truss 24 may be used as optical waveguides. The truss 24 may include electrical or optical connectors 30 to connect the truss 24 to a power circuit or a data circuit (not shown). The truss 24 embedded in the pillar 22, 22', 22" may transfer data or power between the lower body portion 20 and the roof 18 (see FIG. 1). For example, circuits for audio speakers, roof mounted lighting, and ceiling mounted displays may use the truss 24 as an electronic/photonic element. The truss 24 may also transfer power or data between the pillar 22, 22', 22" itself and lower body portion 20 (see FIG. 1) or the roof 18 (see FIG. 1). As such, electronic or photonic elements (not shown) may be embedded in the pillar 22, 22', 22" and be connected to circuits in the vehicle 10 through the truss 24.

It is to be understood that the truss 24 may have a refractive index similar to a refractive index of the translucent polymer composite 26. Alternatively, the truss 24 may be substantially opaque, while optical transmissibility may be provided around the opaque portion of the pillar 22, 22', 22".

Figure 5:
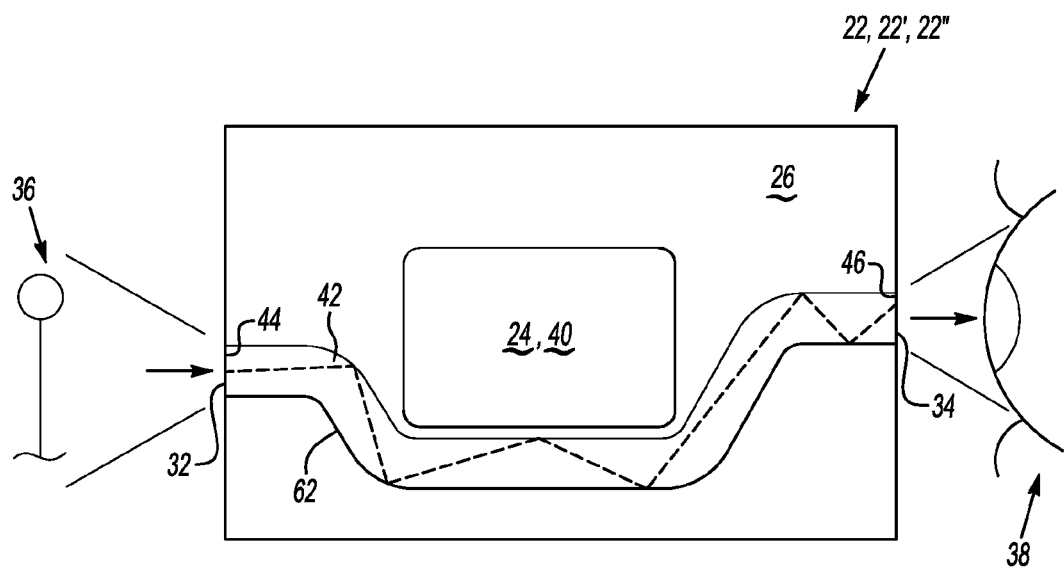
FIG. 5 is a semi-schematic cross-sectional view of an example of a pillar having a waveguide according to the present disclosure.

FIG. 5 is a semi-schematic cross-sectional view of an example of a pillar 22, 22', 22" having an optical waveguide 62 according to the present disclosure. The optical waveguide 62 (also known as a light pipe) operates on the principle of total internal reflection. Light enters the waveguide 62 at an input end 32, is guided within the optical waveguide 62, and exits through an output end 34. The waveguide 62 may be bent around an opaque body 40 so that an observer 38 may visually detect an object 36 seemingly through the opaque body 40. The waveguide 62 may provide an optical tunnel through an otherwise opaque body. The object 36 on an exterior side of the pillar 22, 22', 22" may be visually detectable by an observer 38 even though an opaque body 40 is on a line between the object 36 and the observer 38. It is to be understood that various types of waveguides 62 may be used. A plurality of optical fiber waveguides 62 similar to a fiberscope may be included. The optical waveguide 62 may have various shapes and sizes in cross section, and may be used with or without objective and ocular lenses (not shown). In an example, a bar 42 of polymethylmethacrylate with polished edges 44, 46 respectively on the input end 32 and the output end 34 may be formed around the opaque body 40 as shown in FIG. 5. It is to be understood that the opaque body 40 depicted in FIG. 5 may be a horizontal section of an element that is a portion of the truss 24.

Figure 6:
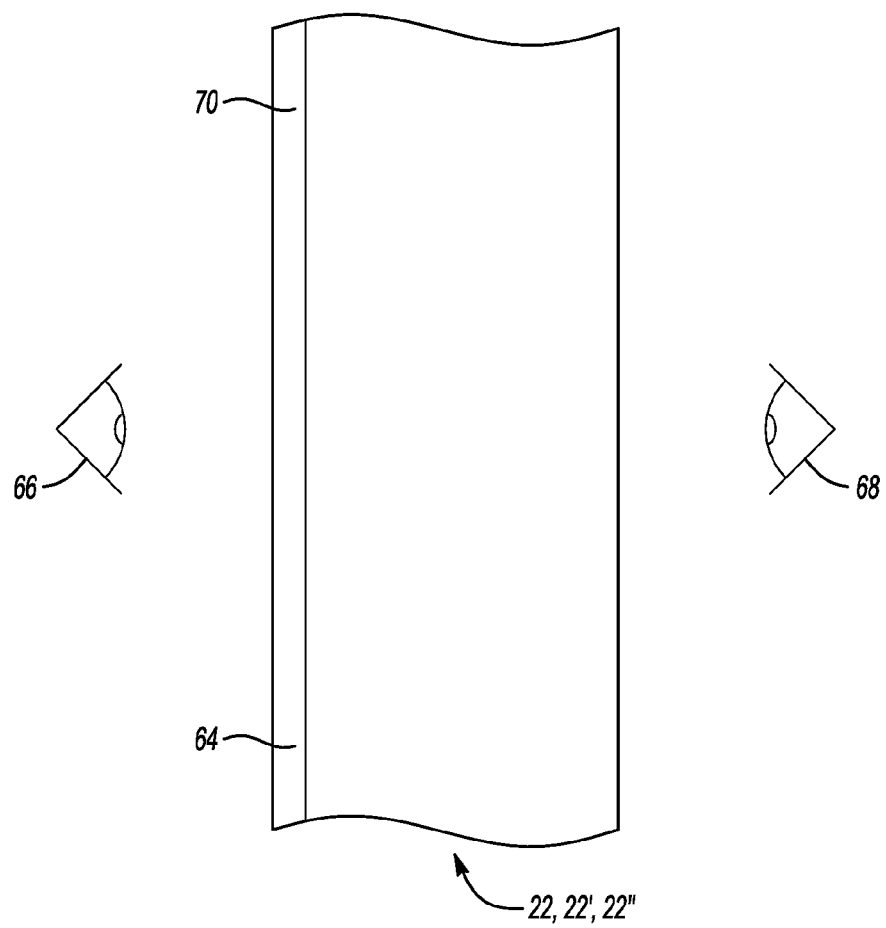
FIG. 6 is a schematic cross-sectional view of an example of a pillar having an optical grating according to the present disclosure.

FIG. 6 schematically depicts an example of a cross section of the pillar 22, 22', 22" having an optical grating 64. The optical grating 64 may be used with examples of the pillar 22, 22', 22" for modification of optical transmissibility of the pillar 22, 22', 22". The optical grating 64 may be used, for example, to reduce glare and reflections that could otherwise be observable from a particular vantage point in the vehicle 10 at night. In another example, the optical grating 64 may prevent a first observer 66 outside of the vehicle 10 from seeing inside the vehicle 10 through the optical grating, but allow a second observer 68 inside of the vehicle 10 to see what is outside of the vehicle 10 through the optical grating 64. As used herein, an optical grating 64 means an array of opaque elements that modify the optical transmissibility of visible light through the array. The opaque elements may be, for example, opaque linear louvers disposed in a thin film. In another example, the opaque elements are small dots, arranged on a surface to cause one-way visibility through the surface. The opaque elements may be an opaque layer with perforations defined therein which may allow one-way visibility. The optical grating 64 may be reflective to light coming from a first direction, and transmissive to light coming from another direction. The optical grating 64 may be a hologram that displays a different aspect of an image from different observation angles. In an example, the optical grating 64 may be disposed in a film to be applied as a layer 70 in the pillar 22, 22', 22".

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Still further, it is to be understood that the ranges provided herein include the stated range and any value or sub-range within the stated range. For example, a range from about 2 mm to about 25 mm should be interpreted to include not only the explicitly recited limits of about 2 mm to about 25 mm, but also to include individual values, such as 2 mm, 10 mm, 18 mm etc., and sub-ranges, such as from about 5 mm to about 23 mm, etc. Furthermore, when "about" is utilized to describe a value, this is meant to encompass minor variations (up to +/− 10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

The invention claimed is:

1. A pillar for a vehicle, comprising:
   a translucent polymer composite having chopped reinforcing fibers incorporated therein; and
   a truss completely embedded in the translucent polymer composite and disposed substantially along a length of the pillar;
   wherein the truss and the translucent polymer composite share a loading condition applied to the pillar; and
   wherein the pillar is to be disposed between a lower body portion of the vehicle and a roof of the vehicle to support the roof.

2. The pillar as defined in claim 1 wherein the truss comprises a metal or a fiber-resin composite including carbon fibers, para-aramid synthetic fibers, basalt fibers, or glass fibers.

3. The pillar as defined in claim 1 wherein the truss includes elements joined together, and wherein the elements are electrical conductors or optical waveguides to transfer power or data.

4. The pillar as defined in claim 3 wherein the truss includes an electrical connector or an optical connector to connect the truss to a power circuit or a data circuit.

5. The pillar as defined in claim 1 wherein the translucent polymer composite is tinted.

6. The pillar as defined in claim 1 wherein the truss has a refractive index within about 5 percent of a refractive index of the translucent polymer composite.

7. The pillar as defined in claim 1 wherein the translucent polymer composite comprises an outer glass fabric layer.

8. The pillar as defined in claim 7 wherein the outer glass fabric layer surrounds the truss.

9. The pillar as defined in claim 1, further comprising a hollow portion having wiring, supplemental restraint system components, or electronic circuit components disposed therein wherein the wiring, supplemental restraint system components, or electronic circuit components are visible through the translucent polymer composite.

10. The pillar as defined in claim 1 wherein the translucent polymer composite comprises one of a thermoplastic polymer material or a thermoset polymer material.

11. The pillar as defined in claim 1 wherein the pillar includes a spatial difference in translucence presenting an observable visual communication.

12. The pillar as defined in claim 11 wherein a portion of the chopped reinforcing fibers cause the spatial difference in translucence.

13. The pillar as defined in claim 1, further comprising an optical grating for modification of optical transmissibility of the pillar.

14. A method of making a pillar for a vehicle, the method comprising:
constructing a truss to be disposed substantially along a length of the pillar; and
applying a translucent polymer composite completely around the truss to form the pillar, the translucent polymer composite having chopped reinforcing fibers incorporated therein;
wherein the pillar is to be disposed between a lower body portion of the vehicle and a roof of the vehicle to support the roof.

15. The method as defined in claim 14 wherein constructing the truss includes joining together rods or tubes.

16. The method as defined in claim 14 wherein constructing the truss includes forming substantially unidirectional composite elements.

17. The method as defined in claim 14 wherein applying the translucent polymer composite around the truss includes:
inserting the truss into a mold cavity;
introducing the translucent polymer composite into the mold cavity to surround the truss;
at least partially curing the translucent polymer composite; and
removing the pillar from the mold.

18. A pillar for a vehicle, comprising:
a translucent polymer composite having chopped reinforcing fibers incorporated therein; and
a truss embedded in the translucent polymer composite and disposed substantially along a length of the pillar;
wherein:
the truss and the translucent polymer composite share a loading condition applied to the pillar;
the pillar is to be disposed between a lower body portion of the vehicle and a roof of the vehicle to support the roof;
the truss includes elements joined together; and
the elements are electrical conductors or optical waveguides to transfer power or data.

19. The pillar as defined in claim 18 wherein the truss includes an electrical connector or an optical connector to connect the truss to a power circuit or a data circuit.

20. A pillar for a vehicle, comprising:
a translucent polymer composite having chopped reinforcing fibers incorporated therein; and
a truss embedded in the translucent polymer composite and disposed substantially along a length of the pillar;
wherein:
the truss and the translucent polymer composite share a loading condition applied to the pillar;
the pillar is to be disposed between a lower body portion of the vehicle and a roof of the vehicle to support the roof; and
the truss has a refractive index within about 5 percent of a refractive index of the translucent polymer composite.

21. A pillar for a vehicle, comprising:
a translucent polymer composite having chopped reinforcing fibers incorporated therein; and
a truss embedded in the translucent polymer composite and disposed substantially along a length of the pillar;
wherein:
the truss and the translucent polymer composite share a loading condition applied to the pillar;
the pillar is to be disposed between a lower body portion of the vehicle and a roof of the vehicle to support the roof;
the translucent polymer composite comprises an outer glass fabric layer; and
the outer glass fabric layer surrounds the truss.

22. A pillar for a vehicle, comprising:
a translucent polymer composite having chopped reinforcing fibers incorporated therein;
a truss embedded in the translucent polymer composite and disposed substantially along a length of the pillar; and
a hollow portion having wiring, supplemental restraint system components, or electronic circuit components disposed therein
wherein:
the truss and the translucent polymer composite share a loading condition applied to the pillar;
the pillar is to be disposed between a lower body portion of the vehicle and a roof of the vehicle to support the roof; and
the wiring, supplemental restraint system components, or electronic circuit components are visible through the translucent polymer composite.

23. A method of making a pillar for a vehicle, the method comprising:
constructing a truss to be disposed substantially along a length of the pillar; and
applying a translucent polymer composite around the truss to form the pillar, the translucent polymer composite having chopped reinforcing fibers incorporated therein;
wherein the pillar is to be disposed between a lower body portion of the vehicle and a roof of the vehicle to support the roof; and
wherein constructing the truss includes joining together rods or tubes.

* * * * *